No. 885,206. PATENTED APR. 21, 1908.
C. F. VERRELL.
DUST COLLECTOR.
APPLICATION FILED APR. 8, 1907.
2 SHEETS—SHEET 1.
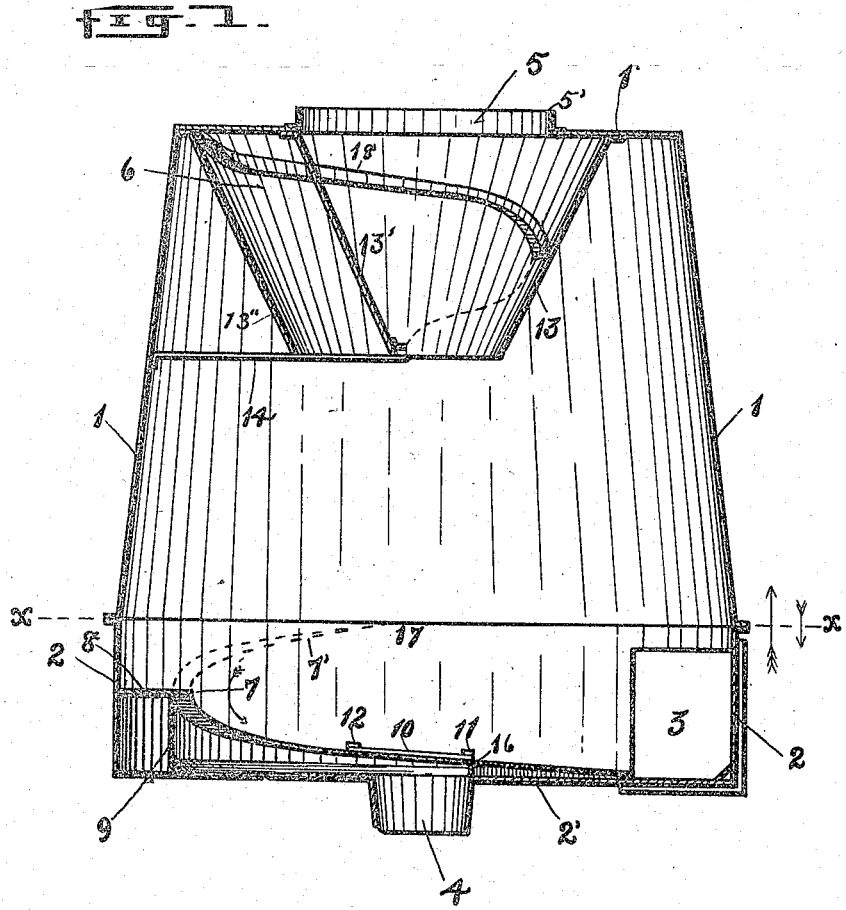

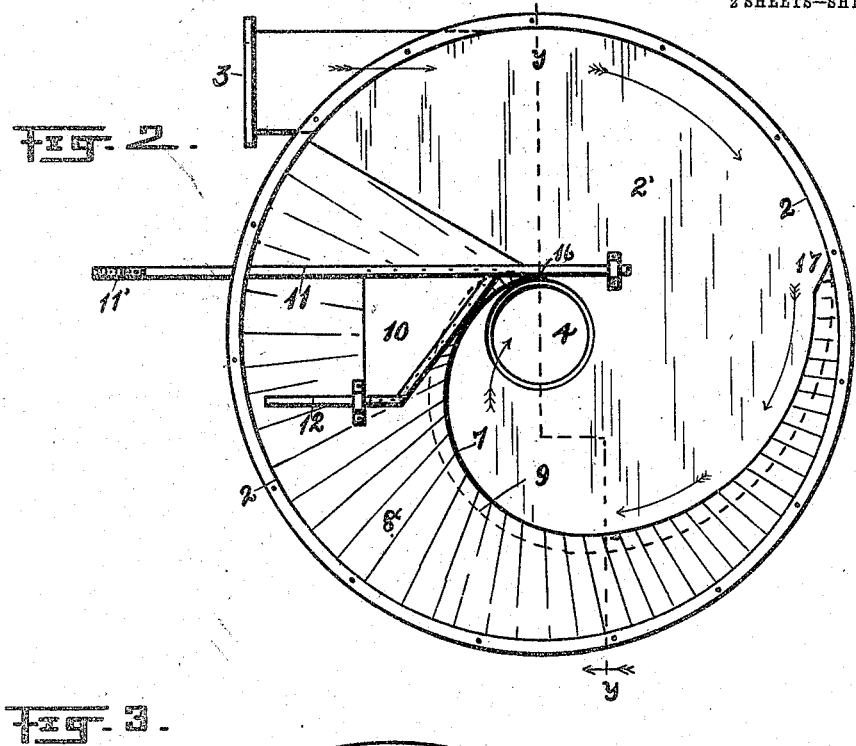
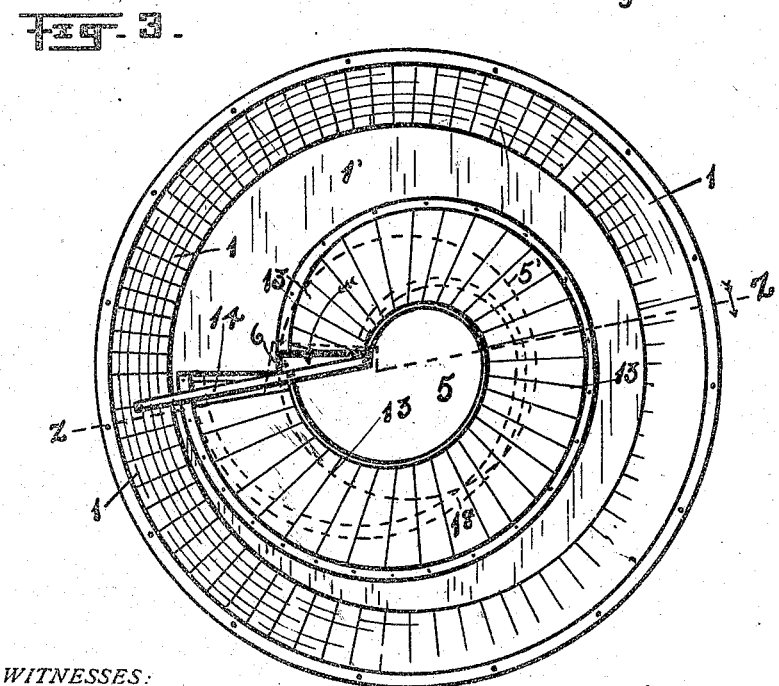

UNITED STATES PATENT OFFICE.

CHARLES F. VERRELL, OF GRAND RAPIDS, MICHIGAN.

DUST-COLLECTOR.

No. 885,206.　　　Specification of Letters Patent.　　　Patented April 21, 1908.

Application filed April 8, 1907. Serial No. 366,929.

*To all whom it may concern:*

Be it known that I, CHARLES F. VERRELL, a citizen of the United States, residing at Grand Rapids, in the county of Kent and State of Michigan, have invented a new and useful Dust-Collector, of which the following is a specification.

My invention relates to improvements in dust-collectors, and in particular to dust-collectors wherein the separation of the dust from the air is effected by giving the air a rotary or whirling motion within a suitable casing or chamber.

The objects of this invention are, first, to provide a dust-collector in which the separation of dust from the air is effected efficiently and economically; second, to provide a device whereby the air-pressure in the dust-outlet of the collector, irrespective of the fan-pressure, can be varied at will and regulated to suit varying conditions; third, to provide a device whereby the fine residual dust, that tends to escape by way of the air-outlet, can be collected and deflected again into the separating-chamber; fourth, to provide a device whereby the rotary or whirling air within the air-chamber of the collector will be deflected inwardly and outwardly through the dust-outlet through its own momentum; and fifth, to provide a device whereby the "intake" of air inwardly through the air-outlet will be prevented.

Further objects will definitely appear from the detailed description to follow.

I accomplish the objects of my invention by the devices and means described in the following specification.

The invention is clearly defined and pointed out in the claims.

A structure embodying the features of my invention is illustrated in the accompanying drawings, forming a part of this specification, in which—

Figure 1 is a vertical section of my improved dust-collector taken on line *y y* of Fig. 2. Fig. 2 is a transverse section taken on line *x x* of Fig. 1, looking in the direction of the little arrow at the end of said line. Fig. 3 is a transverse section taken on line *x x* of Fig. 1, looking in the direction of the long arrow at the end of said line.

Similar letters of reference refer to similar parts throughout the several views.

In constructing my dust-collector, I prefer to use the form shown in the drawings, though other forms may also be used. As shown, my dust-collector consists of an upper truncated conical-shaped air-chamber and a lower cylindrical separating-chamber, and so arranged that the two parts may be bolted or secured together. Entering the separating-chamber at a tangent through the casing 2 is the air and dust inlet 3, while in the base 2', and concentric with its periphery, is the dust-outlet 4 adapted to be connected to furnace-feeder pipes (not shown in the drawings), if so desired. In the top 1' of the air-chamber and concentric with its periphery is the air-outlet 5.

Within the separating-chamber, and secured to the base 2', is the vertical deflector-wall 9. The outer end of this deflector-wall 9 is closely secured to the casing 2 at the point 17 (which is about 90° from the inlet 3), its upper edge being slightly above or in the plane of the upper part of the said inlet. From the point where it is thus secured to the casing 2, the deflector-wall curves spirally and inwardly, the upper edge at the same time curving downwardly from the point of contact with the casing-wall to the periphery of the dust-outlet 4, until the deflector-wall becomes tangent to the periphery of the outlet 4 at the point 16. At right angles to this deflector-wall, and projecting slightly over it so as to form an inwardly-projecting cap 7, is the cover 8 completely covering the space between the deflector-wall 9 and the casing 2. When the dust-laden air enters the inlet 3 it follows the casing 2 until it is deflected by the deflector-wall 9 and the projection 7 downwardly and inwardly towards the outlet 4. The projection 7 tends to confine the dust to the deflector-wall and from following the path of least resistance, which is upwards.

In many dust-collecting systems, it is often desirable to vary the air-pressure in the furnace-feeder pipes without obstructing the stream of dust or other material discharged therethrough. To meet this requirement, I provide a regulator 10 just above the cover 8, at the point where the deflector-wall 9 joins the outlet 4. This regulator 10 is provided with a frame 11 and 12, which slides within suitable guides so that the regulator can wholly or partially cover the outlet 4. The frame 11 is arranged to project through the side of the casing 2 and form the handle 11', so that the regulator can be operated from without. As the dust-laden air, forced in through the inlet 3, is deflected inwardly and downwardly toward the outlet 4, the dust and other material will be carried by its momentum out through the outlet into the furnace-feeder pipes while the greater part of the air will escape upward into the air-chamber. By sliding the regulator out over the outlet a greater amount of air can be deflected through the outlet along with the dust and other material, thus increasing the air-pressure not only in the dust-outlet but also in the furnace-feeder pipes. It is thus possible to regulate the air-pressure without obstructing the stream of material carried by the air through the outlet.

In the air-chamber of my dust-collector is the deflector-wall 13, consisting of a sheet of metal of considerable width secured along its upper edge to the top 1' of the chamber. The deflector-wall is so arranged that its upper edge will form a spiral, its outer end being contiguous to the periphery of the top 1', while the inner end will be tangent to the periphery of the outlet 5. The lower edge of the deflector-wall also forms a spiral, but smaller than that formed by the upper edge, its inner end being coincident with the longitudinal axis of the air-chamber. If this lower edge be projected, it will be found that the curve so traced will be parallel to the curve of the upper edge. As the deflector-wall curves spirally through substantially 360°, it will have outwardly the configuration of an inverted frustum of a cone. The lower edge of this deflector-wall 13 is supported and kept in place by the brace 14. In consequence of the spiral form of this deflector-wall, there is formed an opening 6 between the parallel edges 13' and 13" of the deflector-wall. As the air comes up from the separating-chamber, it has a rotary or whirling motion, with a tendency to follow around within the casing-wall 1 and to collect in the upper peripheral corners of the air-chamber forming an eddy having considerable pressure. The function of this deflector-wall is to deflect and change this rotary motion having approximately the diameter of the air-chamber to a rotary motion of smaller diameter, so that it will be deflected inwardly and its own momentum will carry it outwardly through the air-outlet. Furthermore, I have found that without this deflector-wall there was a flow or "in-take" of air in through the air-outlet at its center, while the air within was passing out through the outlet at its periphery. By the use of this deflector-wall this "in-take" of air is prevented.

In case the air forced into the collector through the inlet 3 carries fine dust, which has a tendency to escape with the air through the outlet 5, I provide an inwardly-projecting flange or guide 18 secured to the inside of the deflector-wall 13. This flange 18 runs from the upper end of edge 13" spirally and downwardly to the lower end of edge 13'. As the dust-laden air enters the opening 6, the dust is deflected by the wall 13 and deflected downward by the flange 18 into the separating-chamber below.

In the operation of my dust-collector, the dust-laden air enters the separating-chamber tangentially through the inlet 3. By virtue of its momentum, the air and dust tend to move in a straight line, but they are guided into a circular path by the casing 2. Having greater mass than the air the dust will collect closely to the casing 2 and when it reaches the deflector-wall 9 it is deflected inwardly and downwardly towards the dust-outlet 4. By manipulating the regulator 10, the pressure in the dust-outlet can be so varied as to get any required volume of air through said dust-outlet along with the material discharged.

By reason of the whirling motion of the air within the separating-chamber, there is formed a vortex, the axis of which substantially coincides with that of the separating-chamber. As the air rises, or is forced, from the separating-chamber to the air-chamber, it still retains its whirling or vertical motion, the mass of air following the casing-wall 1 of the chamber until deflected by the deflector-wall 13. It has been found that, while whirling within the air-chamber, the particles of air will act substantially as the particles of dust in the separating-chamber, and the deflector-wall 13 will prevent the air from whirling bodily in a mass around and within the casing-wall. As the air strikes this deflector-wall 13, its momentum will carry it out through the air-outlet 5. If there should be any fine residual dust carried by this air, it will be caught and guided downward by the flange 18, whence it will be carried by its own momentum and gravity into the separating-chamber below. It is not necessary in all cases, however, to have such a flange.

I have illustrated and described my improved dust-collector in the form preferred by me. I am, however, aware that it is capable of considerable variation in structural details and form, without departing from my invention.

Having thus described my invention, what I claim as new, and desire to secure by Letters Patent, is:

1. In a dust-collector, the combination of a separating-chamber having a peripheral tangential inlet and a dust-outlet concentric with the periphery of said chamber; a vertical deflector-wall in said chamber, having one end secured to the casing of said chamber and then curving spirally until the inner end becomes tangent to the dust-outlet, the upper edge of said deflector-wall curving downwardly from the point of contact with the casing-wall towards the periphery of the outlet; a cover between said deflector-wall and the casing of said chamber and projecting inwardly beyond said deflector-wall; and a regulator arranged to slide over said dust-outlet; substantially as described.

2. In a dust-collector, the combination of a separating-chamber having an inlet and a dust-outlet; a deflector-wall in said chamber, having one end secured to the casing of said chamber and then curving spirally until the inner end becomes tangent to the dust-outlet, the upper edge of said deflector-wall curving downwardly from the point of contact with the casing-wall towards the periphery of the outlet; a cover between said deflector-wall and the casing of said chamber and projecting inwardly beyond said deflector-wall; and a regulator arranged to slide over said dust-outlet; substantially as described.

3. In a dust-collector, the combination of a separating-chamber having an inlet and a dust-outlet; a curved deflecting-member, having an inwardly-projecting cap along its upper edge, in said chamber to guide the dust inwardly and downwardly to the said dust-outlet; and a regulator arranged to coöperate with said dust-outlet whereby the air-pressure in said dust-outlet can be varied at will without obstructing the stream of material discharged.

4. In a dust-collector, the combination of an air-chamber having an air-outlet concentric with the periphery of the top of said chamber; an inverted-conical spirally-arranged deflector-wall in said chamber secured along its upper edge to the top of said chamber, one end of its upper edge being contiguous to the periphery of the top of said chamber, the other end being tangent to the periphery of the air-outlet; and an inwardly-projecting flange on the inside of said deflector-wall, the said flange running spirally from the upper outer edge to the inner lower edge of said deflector-wall; substantially as described.

5. In a dust-collector, the combination of an air-chamber having an air-outlet concentric with the periphery of the top of said chamber; and an inverted-conical spirally-arranged deflector-wall in said chamber secured along its upper edge to the top of said chamber, one end of its upper edge being contiguous to the periphery of the top of said chamber, the other end being tangent to the periphery of the air-outlet; substantially as described.

6. In the air-chamber of a dust-collector and provided with an air-outlet in top of said chamber, means for deflecting the air inwardly and outwardly through said outlet, said means consisting of an inverted-conical spirally-arranged deflector-wall secured along its upper edge to the top of said chamber, one end of its upper edge being contiguous to the periphery of the top of said chamber, the other end being tangent to the periphery of the outlet.

7. In a dust-collector, the combination of a separating-chamber having an inlet and a dust-outlet; a curved deflecting-member, having an inwardly-projecting cap along its upper edge, in said separating-chamber to guide the dust inwardly and outwardly through said dust-outlet; a regulator arranged to slide over said dust-outlet; an air-chamber having an air-outlet; a spirally arranged deflecting-member in said air-chamber for deflecting the air inwardly and outwardly through the said air-outlet; and an inwardly-projecting flange on the inside of the deflecting-member in said air-chamber, said flange running spirally from the upper outer end to the lower inner end of said member.

8. In a dust-collector, the combination of a separating-chamber having an inlet and a dust-outlet; a curved deflecting-member, having an inwardly-projecting cap along its upper edge, in said separating-chamber to guide the dust inwardly and outwardly through said dust-outlet; a regulator arranged to coöperate with said dust-outlet whereby the air-pressure in said outlet can be varied at will without obstructing the stream of material discharged; an air-chamber having an air-outlet; and a spirally-arranged deflecting-member in said air-chamber for deflecting the air inwardly and outwardly through the said air-outlet.

9. In a dust-collector, the combination of a separating-chamber having an inlet for the dust-laden air and a dust-outlet; an air-chamber having an air-outlet; means in said separating-chamber for deflecting the dust inwardly and outwardly through said dust-outlet; a regulator arranged to coöperate with said dust-outlet whereby the air-pressure in said outlet can be varied at will without obstructing the stream of material discharged; and means in said air-chamber for deflecting the air inwardly and outwardly through said air-outlet.

10. In a dust-collector, the combination of a separating-chamber having an inlet and a dust-outlet; a curved deflecting-member, having an inwardly-projecting cap along its upper edge, in said separating-chamber to guide the dust inwardly and outwardly through said dust-outlet; an air-chamber having an air-outlet; and a spirally-arranged deflecting-member in said air-chamber, secured along its upper edge to the top of said chamber, for deflecting the air inwardly and outwardly through the said air-outlet.

11. In a dust-collector, the combination of a separating-chamber having an inlet and a dust-outlet; a curved deflecting-member, having an inwardly projecting cap along its upper edge, in said separating-chamber to guide the dust inwardly and outwardly through said dust-outlet; an air-chamber having an air-outlet; a spirally-arranged deflecting-member in said air-chamber for deflecting the air inwardly and outwardly through said air-outlet; and an inwardly projecting flange on the inside of the deflecting-member in said air-chamber, said flange running spirally from the upper outer end to the lower inner end of said chamber.

12. In a dust-collector, the combination of a separating-chamber, having an inlet and a dust-outlet; a curved deflecting-member in said separating-chamber to guide the dust inwardly and outwardly through said dust-outlet; an air-chamber having an air-outlet; a spirally-arranged deflecting-member in said air-chamber for deflecting the air inwardly and outwardly through the said air-outlet; and an inwardly projecting flange on the inside of the deflecting-member in said air-chamber, said flange running spirally from the upper outer end to the lower inner end of said member.

13. In a dust-collector, the combination of a separating-chamber having an inlet and a dust-outlet; means in said separating-chamber for deflecting the dust inwardly and outwardly through said dust-outlet; a regulator adapted to control the air-pressure in said dust-outlet without obstructing the flow of material discharged therethrough, said regulator being arranged outside of and adjacent to said outlet; an air-chamber having an air-outlet; and means in said air-chamber for deflecting the air inwardly and outwardly through said air-outlet.

14. In a dust-collector having an inlet, a dust-outlet and an air-outlet, the combination of a curved deflecting member for deflecting the dust and other material inwardly and outwardly through said dust-outlet; a regulator adapted to control the air-pressure in said dust-outlet without obstructing the flow of material discharged therethrough, said regulator being arranged adjacent to said outlet; and a spirally arranged deflecting-member for deflecting the purified air inwardly and outwardly through said air-outlet.

15. In a dust-collector having an inlet, a dust-outlet and an air-outlet, means for deflecting the dust inwardly and outwardly through said dust-outlet, and means for deflecting the purified air inwardly and outwardly through said air-outlet, said latter means consisting of an inverted-conical spirally-arranged deflector-wall secured along its upper edge to the top of said chamber, one end of its upper edge being contiguous to the periphery of the top of the dust-collector, the other end being contiguous to the periphery of the air-outlet.

16. In a dust-collector, the combination of a separating-chamber having an inlet and a dust-outlet; means in said separating-chamber for deflecting the dust inwardly and outwardly through said dust-outlet; a regulator adapted to control the air-pressure in said dust-outlet without obstructing the flow of material discharged therethrough; an air-chamber having an air-outlet; and a spirally-arranged deflecting-member in said air-chamber for deflecting the air inwardly and outwardly through said air-outlet and for preventing the intake of air through said outlet.

17. In a dust-collector, the combination of a separating-chamber having an inlet and a dust-outlet; means in said separating-chamber for deflecting the dust inwardly and outwardly through said dust-outlet; a regulator adapted to control the air-pressure in said dust-outlet without obstructing the flow of material discharged therethrough; an air-chamber having an air-outlet; and means in said air-chamber for deflecting the air inwardly and outwardly through said air-outlet and for preventing the intake of air through said outlet.

CHARLES F. VERRELL.

Witnesses:
W. C. MARGESON,
R. M. LATHROP.